United States Patent
Kolhatkar et al.

(10) Patent No.: US 8,738,529 B2
(45) Date of Patent: May 27, 2014

(54) MULTI-CHANNEL DATA DRIVEN, REAL-TIME FRAUD DETERMINATION SYSTEM FOR ELECTRONIC PAYMENT CARDS

(75) Inventors: Jayashree S. Kolhatkar, Emerald Hills, CA (US); Sangita S. Fatnani, Cupertino, CA (US); Yitao Yao, Saratoga, CA (US); Kazuo Matsumoto, Santa Clara, CA (US)

(73) Assignee: Wal-mart Stores, Inc., Bentonville, AR (US)

( * ) Notice: Subject to any disclaimer, the term of this patent is extended or adjusted under 35 U.S.C. 154(b) by 0 days.

(21) Appl. No.: 13/549,491

(22) Filed: Jul. 15, 2012

(65) Prior Publication Data

US 2013/0018795 A1     Jan. 17, 2013

Related U.S. Application Data

(60) Provisional application No. 61/508,486, filed on Jul. 15, 2011.

(51) Int. Cl.
    *G06Q 20/10*        (2012.01)
    *G06Q 20/00*        (2012.01)
    *G06Q 40/00*        (2012.01)

(52) U.S. Cl.
    CPC ............... *G06Q 40/00* (2013.01); *G06Q 20/10* (2013.01); *G06Q 20/00* (2013.01)
    USPC ......................................................... 705/44

(58) Field of Classification Search
    CPC ........ G06Q 40/00; G06Q 20/40; G06Q 20/10
    USPC ........................................................... 705/44
    See application file for complete search history.

(56) References Cited

U.S. PATENT DOCUMENTS

| 8,140,415 | B2 | 3/2012 | Lawrence |
| 8,412,605 | B2 * | 4/2013 | Griffin et al. ................... 705/35 |
| 2012/0317027 | A1 * | 12/2012 | Luk et al. ........................ 705/44 |
| 2013/0018796 | A1 | 1/2013 | Kolhatkar |

OTHER PUBLICATIONS

U.S. Appl. No. 13/549,492, filed Jul. 15, 2012, Entitled, "Multi-Channel Data Driven, Real-Time Anti-Money Laundering System for Electronic Payment Card".

* cited by examiner

*Primary Examiner* — James A Vezeris
*Assistant Examiner* — Clifford Madamba
(74) *Attorney, Agent, or Firm* — Convergent Law Group LLP

(57) ABSTRACT

Exemplary embodiments for detecting electronic payment card fraud include receiving real-time payment card transaction data from ingress channels and an egress channels of at least one payment card system through a first application programming interface (API); generating transactional profiles for each of at least payment cards, the ingress channel, the egress channels, and funding sources of the payment cards; in response to receiving transaction data for a current payment card transaction, evaluating the transaction data using a predictive algorithm that compare the transaction data to the transactional profiles to calculate a probabilistic fraud score for the current transaction; evaluating the probabilistic fraud score and the current transaction data based on a set of rules to generate a recommendation to approve, decline or review the current transaction; and transmitting the recommendation back to the payment card system via a second API.

21 Claims, 7 Drawing Sheets

MULTI-CHANNEL DATA DRIVEN, REAL-TIME FRAUD DETERMINATION SYSTEM FOR ELECTRONIC PAYMENT CARDS

CROSS-REFERENCE TO RELATED APPLICATIONS

This application claims the benefit of provisional Patent Application Ser. No. 61/508,486, filed Jul. 15, 2011, incorporated herein by reference.

BACKGROUND

A stored-value card refers to monetary value stored on a card not in an externally recorded account, while with a prepaid card money is on deposit with an issuer similar to a debit card. That is, the term stored-value card means the funds and or data are physically stored on the card, while with a prepaid card the data is maintained on computers affiliated with the card issuer. Another difference between stored value (SV) cards and prepaid (PP), referred to collectively as SV/PP or electronic payment cards, is that prepaid debit cards are usually issued in the name of individual account holders, while stored value cards are usually anonymous.

Stored Value/Pre-Paid cards allow for anonymous loading of monetary value on these cards by fraudsters through stolen financial instruments and cash at multiple channels or entry points, namely web, mobile, agents and other point of sale mechanisms. Currently all of these channels operate independently and without knowledge of transactional activities on other channels. Electronic payment cards allow for multiple channels of disbursements or exit points, namely physical point of sale locations, web, ATM and mobile.

One problem with electronic payment cards is that fraud perpetrators can avoid detection by loading multiple smaller value stored value/pre-paid cards simultaneously on different channels for entry into the system. In addition, money movement from a compromised entry source to a fraudulent SV/PP card is very rapid. Further, money movement between countries is very easy and rapid, making recapture of fraudulent funds more difficult based on the plurality of regulations and jurisdictions that can apply.

Accordingly, it would be desirable to provide an improved method for detecting electronic payment card fraud.

BRIEF SUMMARY

Exemplary embodiments provide methods and systems for detecting electronic payment card fraud. Aspects of the exemplary embodiments include receiving real-time payment card transaction data from ingress channels and an egress channels of at least one payment card system through a first application programming interface (API); generating transactional profiles for each of at least payment cards, the ingress channel, the egress channels, and funding sources of the payment cards, wherein a first type of transactional profile include a first profile comprising a network graph of links between the ingress channels, the egress channels, the payment cards, and any users of the payment cards and geo-location identities associated with the payment cards; in response to receiving transaction data for a current payment card transaction, evaluating the transaction data using a predictive algorithm that compare the transaction data to the transactional profiles to calculate a probabilistic fraud score for the current transaction; evaluating the probabilistic fraud score and the current transaction data based on a set of rules to generate a recommendation to approve, decline or review the current transaction; and transmitting the recommendation back to the payment card system via a second API.

DETAILED DESCRIPTION

Figure 1:
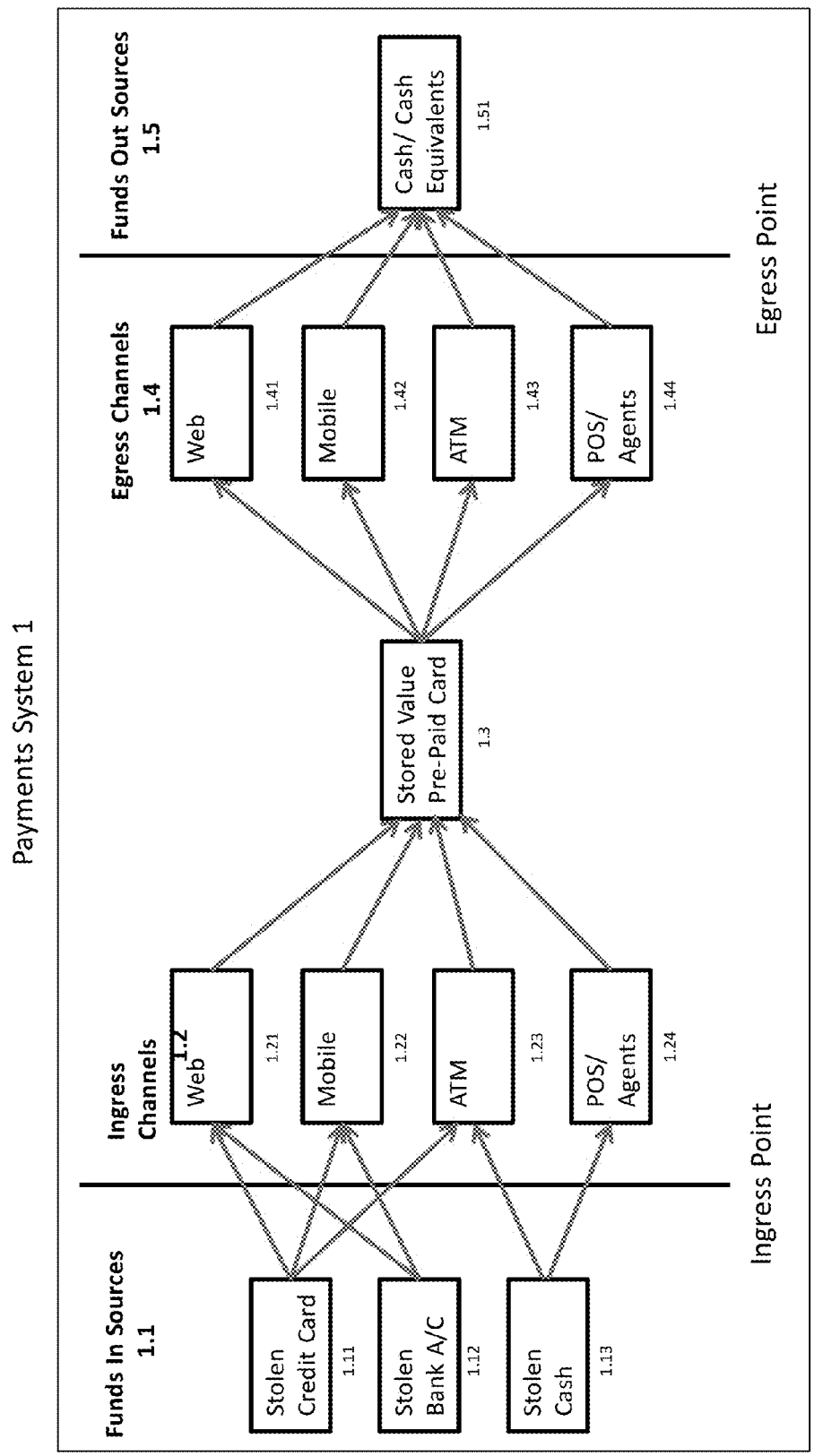
FIG. 1 shows a conventional electronic payments system and the movement of fraudulent funds through an electronic payment card network.

The exemplary embodiments relate to methods and systems for detecting electronic payment card fraud. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

The exemplary embodiments provide methods and systems for detecting electronic payment card fraud for multi-channel funds-in and funds-out electronic payment card programs. The exemplary embodiment will be explained in terms of an electronic payment card that is intended to include stored value cards and pre-paid cards. However, in some embodiments, electronic payment cards may also include credit and debit cards.

The fraud monitoring method and system of the exemplary embodiment allow for real-time monitoring of all funds loaded onto an electronic payment card, all fund movement within an electronic payment card system, and all fund exits out of the electronic payment card system. One aspect of the exemplary embodiment is the ability of the fraud detection system to create a network of linked individuals, channels, electronic payment cards, geographies and time to describe fraudulent behavior, and to use this network to assign probabilities of a current transaction being a fraudulent transaction. Based on these probabilities, a recommendation is created and sent back to the payments system through a recommendation application programming interface (API) to approve, decline or review the transaction.

Real-time monitoring of funds moving into and exiting an electronic payment card across multiple channels may be accomplished with the use of: a) real-time feedback events that notify the fraud detections system of known fraud behavior, and b) self-learning fraud prediction algorithms that use this real-time feedback to modify the algorithms to account for current patterns in fraud behavior. The fraud detection system dynamically updates and reflects current fraud trends for detecting patterns of use as wells as tracks fund movements to electronic payment cards. The fraud detection system uses payment card transaction data from conventional payments systems to build profiles and networks of users, payment cards, ingress and egress channels and funding sources across multiple dimensions.

The system has abilities to track money through each point of transfer through the network and represent it as a visual graphic, allowing for enhanced fraud monitoring and detection. The fraud detection system evaluates the network created by the transactional, ingress and egress channel links to the electronic payment cards as well as the adjoining networks to assess fraud risk of the electronic payment cards. The system has abilities to use past history of suspicious behavior in the form of probabilistic and deterministic negative files to generate recommendation to decline or review a current card transaction, when strong links are established between an incoming user/card with those on negative files. The fraud detection system also may evaluate every transaction in an electronic payment card system in real-time using internal and external data to predict fraud risk with a dynamic rules engine and/or predictive models to recommend a decision to approve/decline/review a card transaction. Internally created data and externally sourced data may be merged to validate geo-location, phone numbers, addresses, devices, and the like.

FIG. 1 shows a conventional electronic payments system and the movement of fraudulent funds through a payments system. The payments system 1 comprises a card network that includes potential ingress and egress channels 1.2 and 1.4 to and from an electronic payment card 1.3, as well as the funds in sources 1.1 and funds out sources 1.5 for adding and extracting value from the electronic payment card 1.3. The ingress channels 1.2 include points of entry through the internet/web 1.21 (example: Pre-Paid Card sites), mobile phones 1.22, adding funds to the payment card at an ATM 1.23 (Automated Teller Machine) or at a physical point of sale or agent 1.24 (example: brick and mortar stores). Funding sources 1.1, which can be used to introduce fraudulent funds into the system, include stolen credit or debit cards 1.11, stolen bank checking and savings accounts 1.12, or stolen cash 1.13.

The egress channels 1.4 may include using the electronic payment card on the internet/Web 1.41 to buy easily fenceable goods or digital goods; using mobile phones 1.42 to move money to other accounts and/or buy digital goods, using ATM 1.43 to withdraw funds as cash, using the electronic payment card at a Point of Sale 1.44 venues to buy fenceable goods and withdraw funds as cash.

Each of the channels 1.2 and 1.4 and funding mechanisms are distinctly different. Each of the channels 1.2 and 1.4 and funding mechanisms have distinct fraud prevention needs that address matching individual fraud vulnerabilities. In current payments systems 1 the fraud system runs on disparate rails, with each channel and funding source reviewing fraud risk as is appropriate to itself. Such a non-aggregated system does not allow for a wider view of fraud risk and propagates a fragmented fraud prevention effort.

According to the exemplary embodiment, a dynamic fraud detection system is provided that brings together all incoming, outgoing and intra-network electronic payment transactions in real-time through a data transfer API. The data transfer API allows payments systems from various entities, such as banks, to transmit data into the fraud system in real-time in order to reference internal data sources, such as historical transactional profiles, transaction data including transaction specific data as well as geo-location characteristics; and external data sources, to evaluate the holistic fraud risk of the electronic payment card as well as each channel and funding mechanism. After each transaction is completely evaluated, the fraud detection system sends a response that contains a score and a recommendation to approve, decline or review the transaction back to the originating system through a recommendation API. Review of the transaction may require manual review of the transaction by a customer service agent and/or a call to the electronic payments system.

Figure 2:
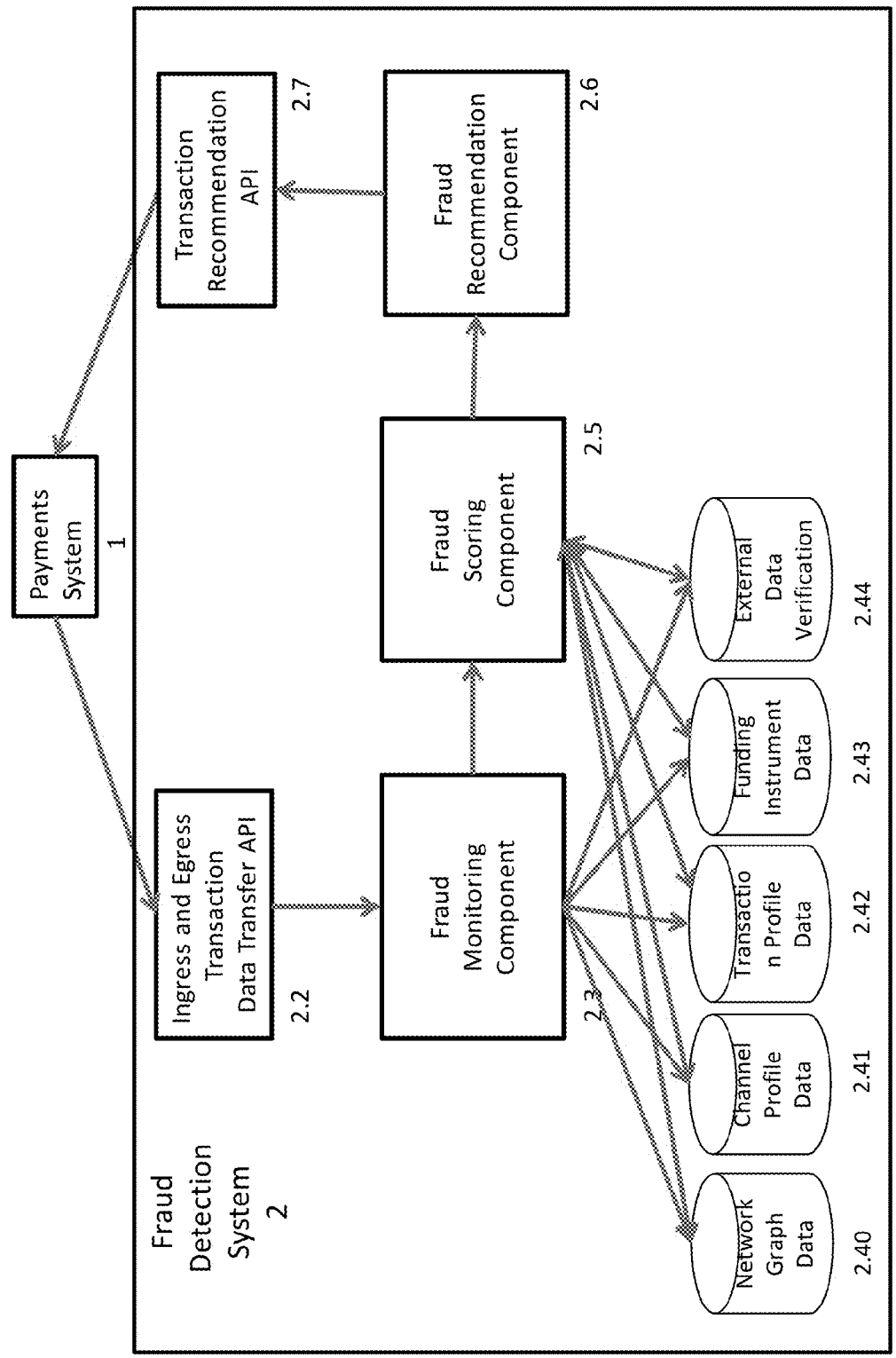
FIG. 2 shows the system for monitoring and identifying fraudulent funds entering/exiting the electronic payment card across multiple channels.

FIG. 2 is a diagram showing components of the dynamic fraud system that evaluate and identify fraudulent funds entering/exiting an electronic payment card across multiple channels. In one embodiment, the fraud system 2 may include an ingress and egress transaction data transfer API 2.2, a fraud monitoring component 2.3, a fraud scoring component 2.5, a fraud recommendation component 2.6, a transaction recommendation API 2.7, and various relational and non-relational databases that may store network graph data 2.40, channel profile data 2.41, transactional profile data 2.42, funding instrument data 2.43, and external data verification database 2.44.

Fraud evaluation and detection may begin by receiving real-time payment card transaction data from ingress channels and egress channels from at least one payment card system 1 through the ingress and egress transaction data transfer API 2.2.

This is followed by the fraud monitoring component 2.3 generating and/or updating transactional profiles for each of at least payment cards, the ingress channel, the egress channels, funding sources of the payment cards, and users of the payment cards. The transactional profiles may be used to evaluate usage patterns, and in one embodiment are stored as the network graph data 2.40, the channel profile data 2.41, the transactional profile data 2.42, the funding instrument data 2.43, and the external data verification database 2.44.

In one embodiment, the fraud monitoring component 2.3 may generate two types of transactional profiles for each of the electronic payment card, the ingress channels, the egress channels, and the funding source. The first type of transactional profile may comprise a network graph of links between the ingress channels, the egress channels, the payment cards, any users of the payment cards, and geo-location identities associated with the payment cards. The network graph may be stored as the network graph data 2.40.

The second type of transactional profile may comprise a series of transactional usage patterns at different time intervals for each of the payment cards, the ingress channels, the egress channels, and the funding sources. The transactional usage patterns may be stored as the channel profile data 2.41, the transactional profile data 2.42, and the funding instrument data 2.43. In addition to this data, the fraud management system 2.3 may invoking API calls to populate the external data verification database 2.44 with data retrieved from external sources that are used to verify geo-location (e.g., internet protocol (IP) addresses), phone numbers, and addresses associated with the current transaction.

In one embodiment, the fraud monitoring component 2.3 may comprise three main modules, namely, a network graph module, a profile module, and external data retrieval module (not shown). The network graph module may be configured to create the network graph data 2.40. The profile module may be responsible for creating the transactional profiles, including the channel profile data 2.41, transactional profile data 2.42 and the funding instrument data 2.43. External data retrieval module may be responsible for making the API calls necessary for retrieving the external data used to populate the external verification database 2.44. All three modules may be configured to facilitate fast traversal through the data, allow for new data elements to be added without schema changes and accommodate sparse data structures. The three modules may be meta-data driven and may have an embedded rules language to build and update relationships and profiles.

After the appropriate transactional profiles are created for the transaction data received from the payments system 1 for a current payment card transaction, the transaction data is processed by the fraud scoring component 2.5. In response to receiving transaction data for the current payment card transaction, the fraud scoring component 2.5 uses a set of predictive algorithms that compare the transaction data to the transactional profiles to calculate a probabilistic fraud score for the current transaction.

In one embodiment, the fraud scoring component 2.5 has the capability to pull data from the network graph data 2.40, the channel profile data 2.41, the transactional profile data 2.42, the funding instrument data 2.43 and from the external data verification API 2.44 to compute predictive probabilistic scores.

The fraud scoring component 2.5 may be configured to utilize multiple predictive algorithms in general as well as within a given use case. The predictive algorithms may include, but are not limited to, regression, decision trees, neural networks, random forest, and genetic algorithms. The result of the fraud scoring component 2.5 is a probabilistic score assigned to a transaction and/or to the parties involved in the transaction. The fraud scoring component 2.5 is designed to be self-learning with the ability to incorporate new fraudulent behaviors into the predictive algorithms.

Next, the fraud recommendation component 2.6 evaluates the probabilistic fraud score and the current transaction data based on a set of rules and generates a recommendation to approve, decline or review the current transaction. The fraud recommendation component 2.6 then transmits the recommendation back to the payment card system 1 via the recommendation APIs 2.7.

The fraud recommendation component 2.6 may utilize a rules language to build and deploy cutoff strategies further refining the probabilistic score to minimize false positive and false negative incidences. The fraud recommendation component 2.6, similar to the fraud scoring system 2.5, has access to all other systems and data within the larger fraud detection system 2. The fraud recommendation component 2.6 may have self discovery capabilities that allow it to discover and use new data elements without schema and code changes due to the meta-data driven nature of the system. The fraud recommendation component 2.6 packages the probabilistic score along with a recommendation to approve, decline or review that is sent to the payments system 1 through the transactions recommendation API 2.7. The recommendation can be embedded as part of a response back to an incoming transaction request received over the data transfer API, or can be posted asynchronously to a pre-defined location.

One aspect of the exemplary embodiment is the ability of the fraud detection system 2 to communicate with one or more payment systems 1. In one embodiment, the ingress/egress transaction data transfer API 2.2 contains two components, a fixed component that allows for uniformity of sending data across multiple channels and a flexible component that allows each channel to send data that is unique and relevant to that channel. The ingress/egress transaction data transfer API 2.2 may use JavaScript Object Notation (JSON) to define the payload.

In one embodiment, the ingress/egress transaction data transfer API 2.2 can be one of three versions: 1) Fire and Forget—used when a sending entity does not expect a response but is merely sending the message to advise the fraud detection system 2 of a change in status of the payment card; 2) Synchronous—used when a sending entity is expecting a recommendation as part of the response back to the sending entity; and 3) Asynchronous—used when a sending entity is expecting a recommendation but not as part of the response back. An asynchronous response is posted back to the sending entity's pre-designated location.

Although the ingress and egress transaction data transfer API 2.2, the fraud monitoring component 2.3, the fraud scoring component 2.5, the fraud recommendation component 2.6, and the transaction recommendation API 2.7 are shown as separate components, the functionality of each may be combined into a lesser or greater number of modules/components.

In addition, it should be understood the fraud detection system may be implemented as a web service that communicates with one or multiple payments systems 1 over the internet through respective servers (not shown). Further, the fraud monitoring component 2.3, the fraud scoring component 2.5, and the fraud recommendation component 2.6 may run on one or more servers or on any type of computers that have memory and processors.

The servers and/or computers comprising the fraud detection system 2 may include hardware components of typical computing devices (not shown), including one or more processors, input devices (e.g., keyboard, pointing device, microphone for voice commands, buttons, touchscreen, etc.), and output devices (e.g., a display device, speakers, and the like). The servers and computers may include computer-readable media, e.g., memory and storage devices (e.g., flash memory, hard drive, optical disk drive, magnetic disk drive, and the like) containing computer instructions that implement the functionality disclosed when executed by the processor (s). The server and/or the computers may further include wired or wireless network communication interfaces for communication.

Figure 3:
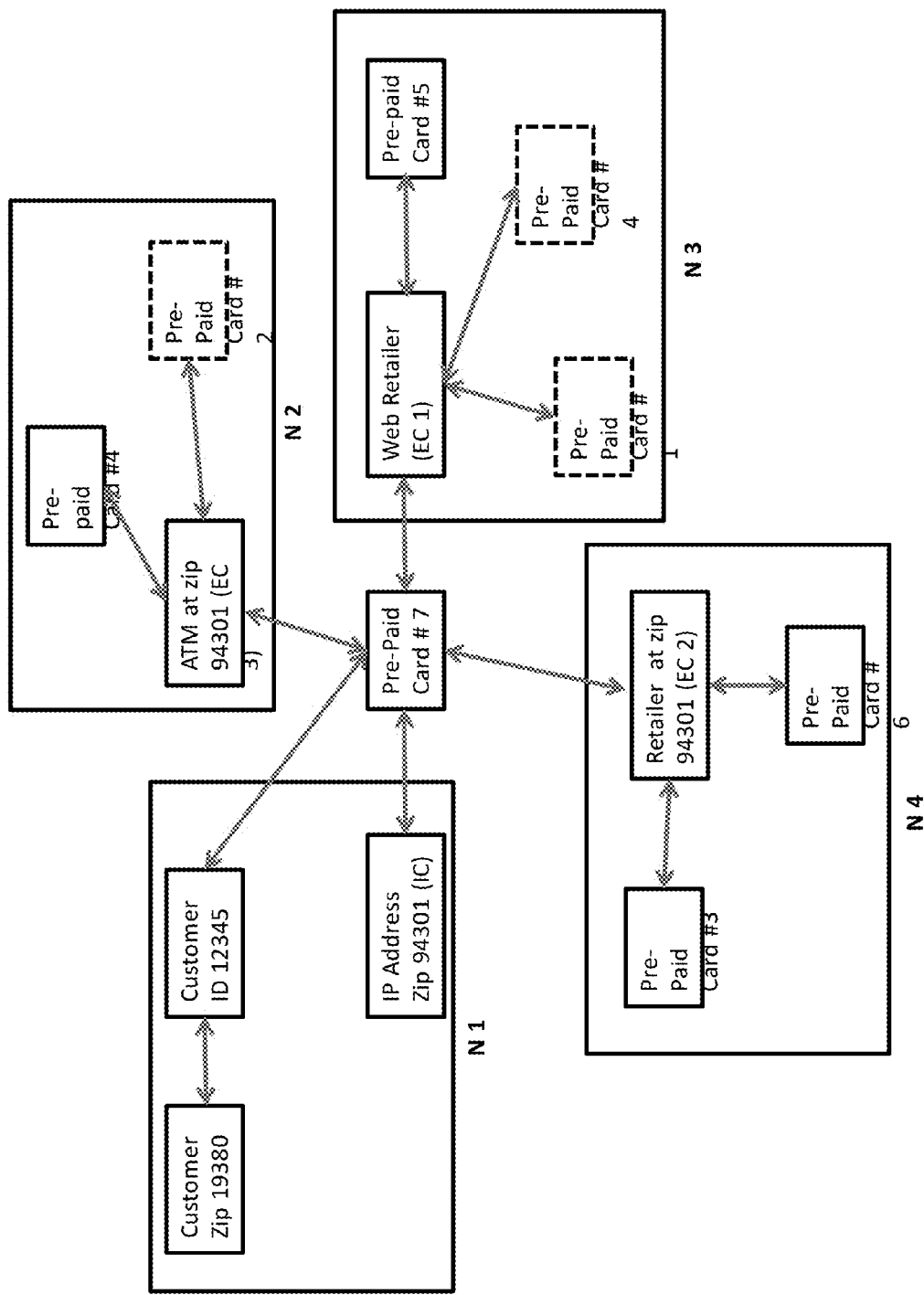
FIG. 3 shows processing by a network graph module of the fraud detection system that uses networks and links to calculate a probabilistic negative score relating to an electronic payment card.

FIG. 3 describes processing of the fraud scoring component 2.5 to use networks and links between the ingress/egress channels, funding source and other electronic payment cards to calculate probabilistic negative scores for a card transaction in one embodiment. The fraud scoring component 2.5 leverages surrounding networks around first order links to calculate probabilistic negative scores. For example, network N1 depicts the customer and Ingress network around pre-paid card 7. Network N1 has geo-location discrepancies between the customer geo-location and the ingress channel geo-location because the customer using prepaid card 7 has a ZIP code of 19380, while the customer's IP address indicates the ZIP code is 94301. Additionally, networks N2 and N3 that are linked to pre-paid card 7 through the egress channels of a web retailer (EC 1) and an ATM (EC 3), have a high rate of known "fraud" prepaid cards (prepaid cards 1, 4 and 2). Using these statistics about networks 1, 2 and 3, the fraud scoring component 2.5 may assign a high probability of pre-paid card 7 being fraudulent.

Figure 4:
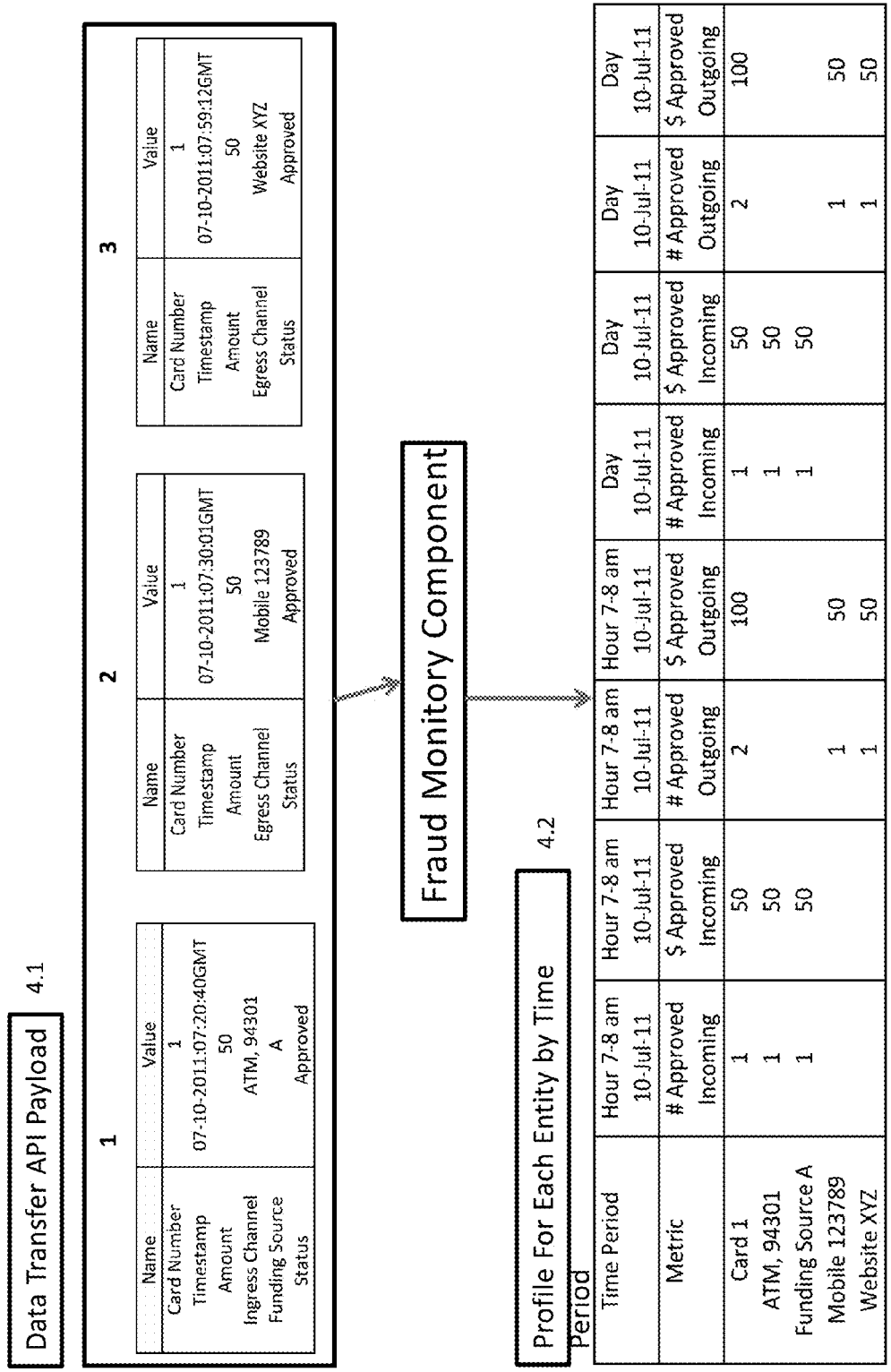
FIG. 4 shows processing by a profile module of the fraud detection system that creates and maintains profiles by time period for electronic payment cards, ingress/egress channels and funding source.

FIG. 4 is a diagram illustrating a process the profile module of the fraud monitoring component 2.3 performs to create and store transactional usage patterns. The transaction data comes into the fraud detection system 2 through the data transfer API 2.2 in a data transfer API payload 4.1. In this example, the data transfer API payload 4.1 includes three transactions for payment card 1. The first transaction shown is a funding transaction and the other two transactions are buying transactions. All transactions indicate relevant ingress or egress channels and/or the funding source. Once received by the fraud monitoring component 2.3, the profile module stores the transactions in a profile for each entity by time period 4.2 as shown.

The funds moving on to an electronic payment card may happen simultaneously across multiple channels and multiple funding sources. The Funds In fraud system process looks at all ingress channels simultaneously and evaluates fraud risk on both individual electronic payment cards as well as the individual ingress channel.

Figure 5:
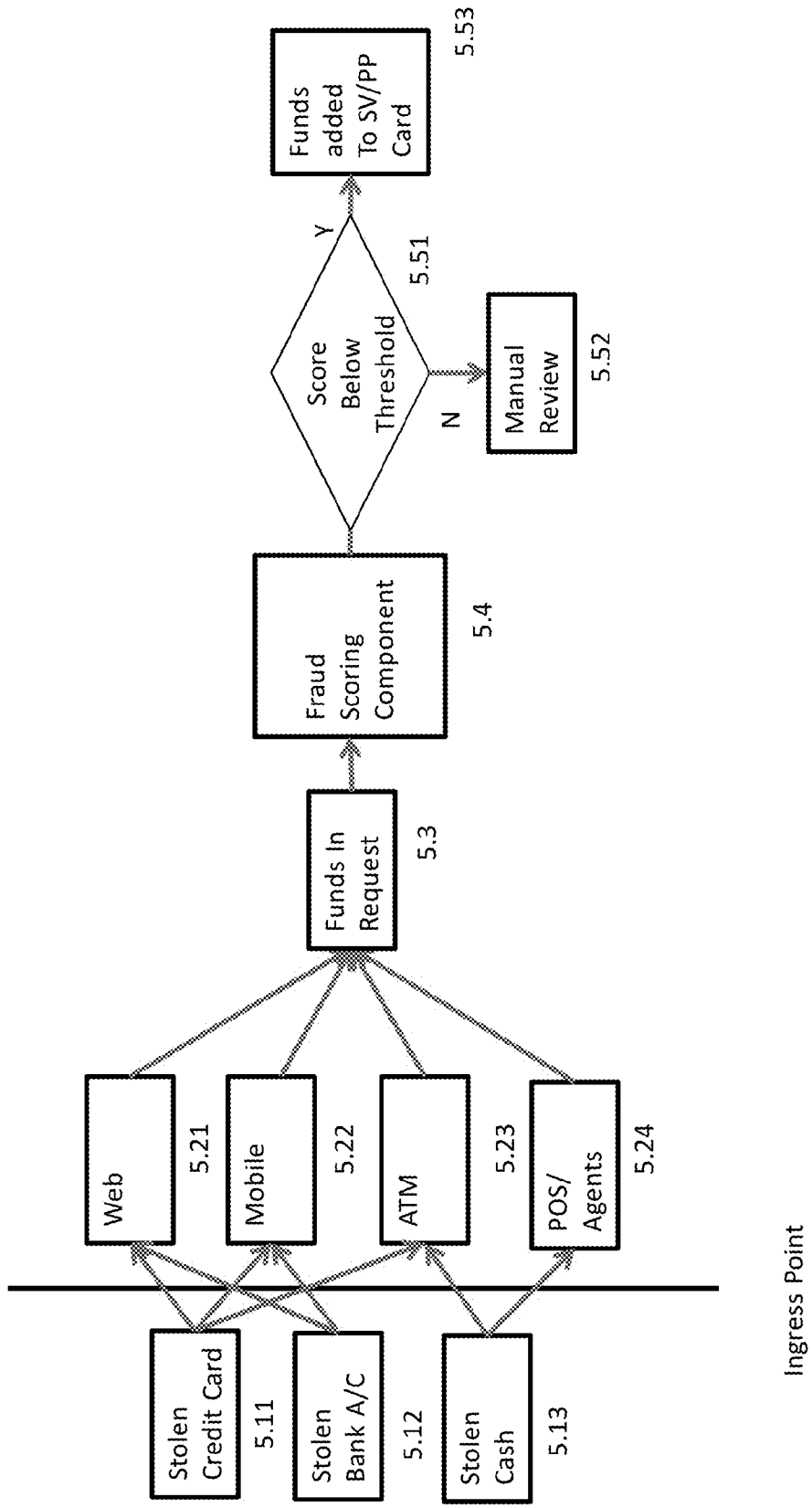
FIG. 5 shows a process for evaluating fraudulent funds entering an electronic payment card across multiple channels.

FIG. 5 shows a process for evaluating fraudulent funds entering an electronic payment card across multiple channels. The process for evaluating fraud begins when the fraud detection system 2 receives a request for moving funds in 5.3 from the payment system 1. The ingress channels 5.21-5.24 and funding sources 5.11-5.13 may be any combination of the channels and funding sources described in FIG. 1. The fraud detection system 2 in real time evaluates transaction data from the request and updates or creates profiles for the specified user, the ingress channel and the funding source, as described above. The transaction is passed along to the fraud scoring component, which assigns the transaction a probabilistic scored using one or many predictive algorithms. The transaction and the score move to the fraud recommendation component, which based on a set of heuristic rules determines if the score is below a predetermined threshold for the attributes of the transaction in block 5.51. Based on this determination, a recommendation is generated to approve, decline or review the transaction. The recommendation API transports the recommendation to the payment system 1. If the recommendation is an approval, the funds may be added to the card in block 5.53. If the recommendation is to decline or to review, then the transaction may be sent for manual review in block 5.52.

According to the exemplary embodiment, the funds in process looks at all ingress points simultaneously as well as all funding sources funding in to a single point, allowing for capturing fraud at both an electronic payment card level as well as the individual ingress point.

Figure 6:
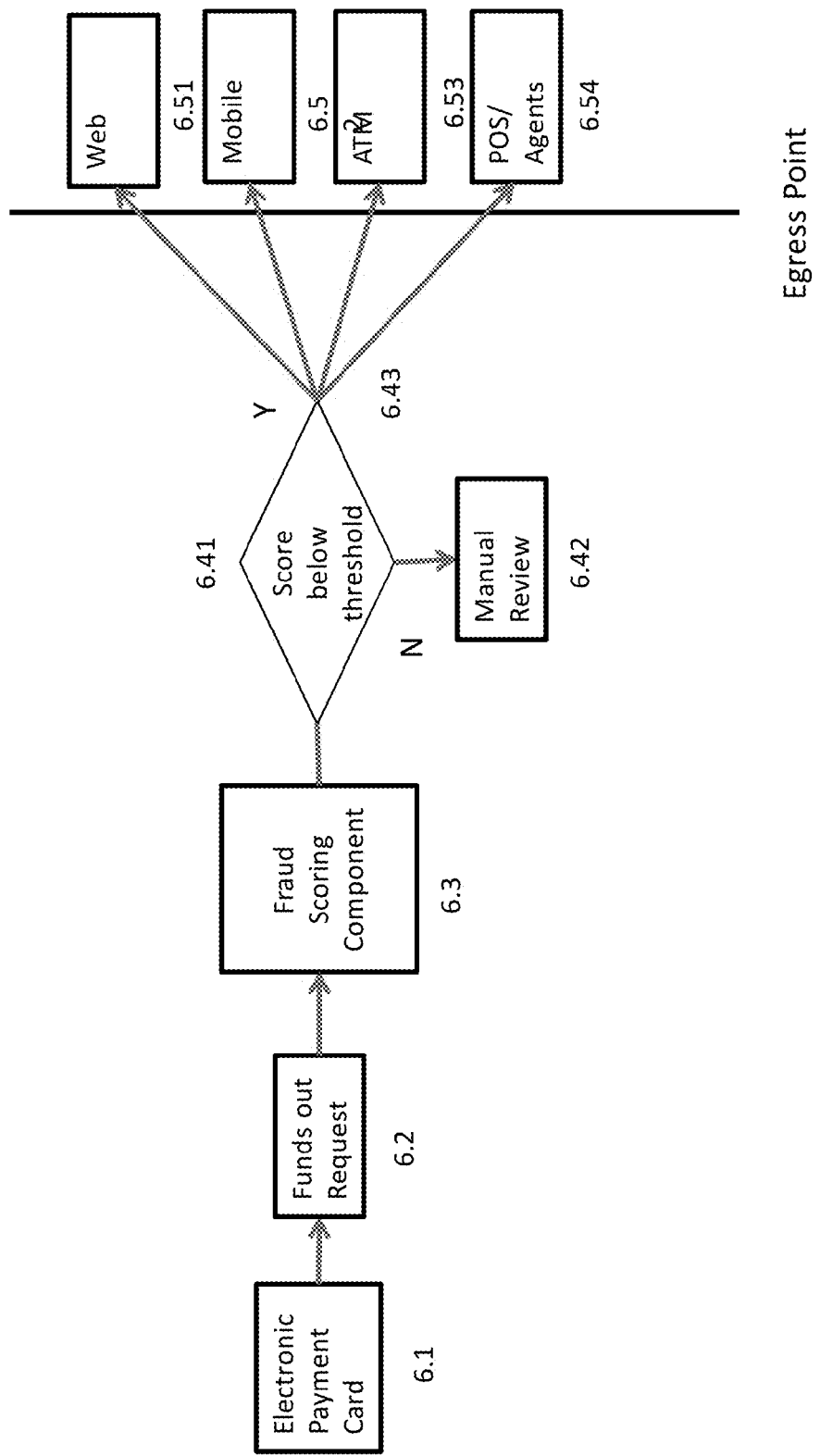
FIG. 6 shows a process for evaluating fraudulent funds exiting from an electronic payment card to multiple channels.

FIG. 6 shows a process for evaluating fraudulent funds exiting from an electronic payment card to multiple channels. The process for evaluating fraud begins when the payments system 6.1 sends a funds out request 6.2 to the fraud detection system. The fraud detection system in real time evaluates the transaction and updates or creates profiles for the user, the card, and the egress channel. The transaction is passed along to the fraud scoring component 6.3 where the transaction is scored using one or many predictive algorithms. The result is a probabilistic score assigned to the transaction. The transaction and the score are passed to the fraud recommendation component, which based on a set of heuristic rules determines if the score is below a predetermined threshold for the attributes of the transaction in block 6.41. Based on this determination, a recommendation is generated to approve, decline or review the transaction. The recommendation API transports the recommendation to the payment system 1. If the recommendation is an approval, the funds may be moved out of the card in block 6.43. If the recommendation is to decline or to review, then the transaction may be sent for manual review in block 6.42.

The funds out process evaluates at all egress points simultaneously, allowing for capturing fraud at both an electronic payment card level as well as the individual egress point.

Figure 7:
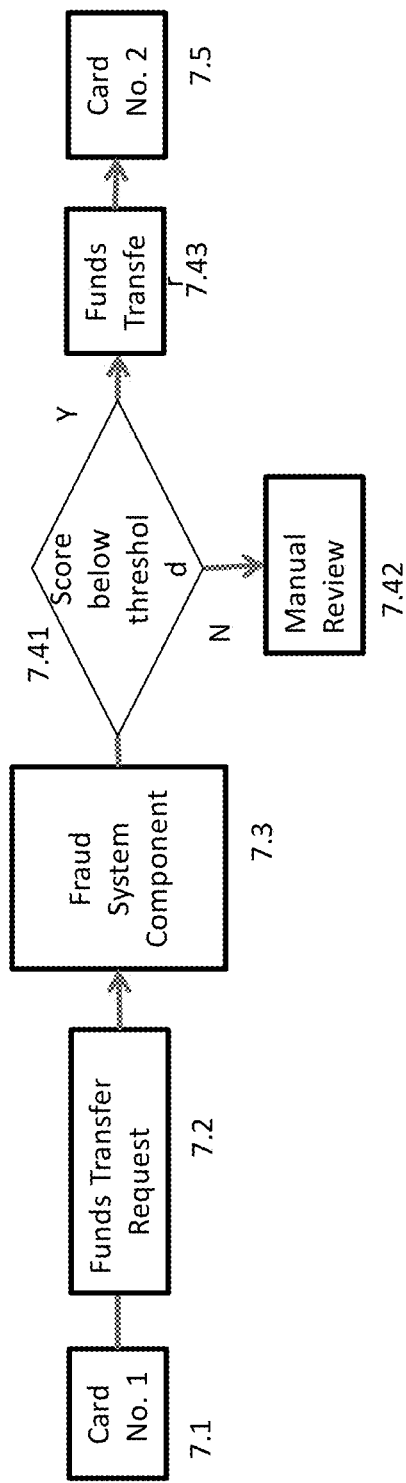
FIG. 7 shows a process for evaluating fraudulent funds moving across multiple electronic payment cards.

FIG. 7 shows a process for evaluating fraudulent funds moving across multiple electronic payment cards. Funds can be moved from one payment card to another electronic payment card, thus obfuscating the movement of money within the payments card system before exiting the fraudulent funds out of the system. The process starts with the fraud detection system 2 receiving from the payments system 2 a funds transfer request 7.2 on behalf of payment card no 1 (7.1). The fraud monitoring component in real time evaluates the transaction and updates or creates profiles for the user, the channel and the funding Source. The transaction is passed along to the fraud scoring component 7.3 where the transaction is scored using one or many predictive algorithms. The result is a probabilistic score assigned to the transaction. The transaction and the score are passed to the fraud recommendation component, which based on a set of heuristic rules determines if the score is below a predetermined threshold for the attributes of the transaction in block 7.41. Based on this determination, a recommendation is generated to approve, decline or review the transaction. The recommendation API transports the recommendation to the payment system 1. If the recommendation is an approval, the funds may be transferred to card no. 2 in block 7.43. If the recommendation is to decline or to review, then the transaction may be sent for manual review in block 7.42.

A method and system for detecting electronic payment card fraud has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable medium such as a memory, a hard disk, or a CD/DVD-ROM and is to be executed by a processor. Accordingly, many modifications may be made by one of ordinary skill in the art without departing from the spirit and scope of the appended claims.

We claim:

1. A computer-implemented method for detecting electronic payment card fraud, comprising:
   receiving, by at least one software component executing on at least one processor, real-time payment card transaction data from ingress channels and an egress channels of at least one payment card system through a first application programming interface (API);
   generating, by the at least one software component, at least two types of transactional profiles for each of at least payment cards, the ingress channel, the egress channels, and funding sources of the payment cards,
      wherein a first type of transactional profile comprises a network graph of links between the ingress channels, the egress channels, the payment cards, and any users of the payment cards and geo-location identities associated with the payment cards; and wherein a second type of transactional profile comprises a series of transactional usage patterns at different time intervals of each of the payment cards, the ingress channels, the egress channels, and the funding sources;

in response to the at least one software component receiving transaction data for a current payment card transaction, evaluating the transaction data using a predictive algorithm that compare the transaction data to the transactional profiles to calculate a probabilistic fraud score for the current transaction;

evaluating the probabilistic fraud score and the current transaction data based on a set of rules to generate a recommendation to approve, decline or review the current transaction; and transmitting the recommendation back to the payment card system via a second API.

2. The method of claim 1 wherein generating transactional profiles further comprises populating an external data verification database with data retrieved from external sources and using the data for verification of geo-location, phone numbers, and addresses associated with the current payment card transaction.

3. The method of claim 1 further comprising calculating the probabilistic fraud score using multiple predictive algorithms comprising any combination of regression, decision trees, neural networks, random forest, and genetic algorithms.

4. The method of claim 1 wherein evaluating the probabilistic fraud score further comprises utilizing a rules language to build and deploy cutoff strategies for creating appropriate recommendations.

5. The method of claim 1 wherein transmitting the recommendation back to the payment card system further comprises one of embedding the recommendation as part of a response back to an incoming transaction request and posting the recommendation asynchronously to a pre-defined location.

6. The method of claim 1 wherein the method is performed by a fraud detection system that communicates with one or more card payments systems using the first and second APIs.

7. The method of claim 1 wherein the first API comprises a fixed component that allows for uniformity of sending data across multiple channels and a flexible component that allows each of the channels to send data that is unique to that channel.

8. An executable software product stored on a non-transitory computer-readable medium containing program instructions for detecting electronic payment card fraud, the program instructions for:

receiving real-time payment card transaction data from ingress channels and an egress channels of at least one payment card system through a first application programming interface (API);

generating at least two types of transactional profiles for each of at least payment cards, the ingress channel, the egress channels, and funding sources of the payment cards, wherein a first type of transactional profile comprises a network graph of links between the ingress channels, the egress channels, the payment cards, and any users of the payment cards and geo-location identities associated with the payment cards; and wherein a second type of transactional profile comprises a series of transactional usage patterns at different time intervals of each of the payment cards, the ingress channels, the egress channels, and the funding sources;

in response to receiving transaction data for a current payment card transaction, evaluating the transaction data using a predictive algorithm that compare the transaction data to the transactional profiles to calculate a probabilistic fraud score for the current transaction;

evaluating the probabilistic fraud score and the current transaction data based on a set of rules to generate a recommendation to approve, decline or review the current transaction; and transmitting the recommendation back to the payment card system via a second API.

9. The software product of claim 8 wherein generating transactional profiles further comprises software instructions for populating an external data verification database with data retrieved from external sources and using the data for verification of geo-location, phone numbers, and addresses associated with the current payment card transaction.

10. The software product of claim 8 further comprising software instructions for calculating the probabilistic fraud score using multiple predictive algorithms comprising any combination of regression, decision trees, neural networks, random forest, and genetic algorithms.

11. The software product of claim 8 wherein evaluating the probabilistic fraud score further comprises software instructions for utilizing a rules language to build and deploy cutoff strategies for creating appropriate recommendations.

12. The software product of claim 8 wherein transmitting the recommendation back to the payment card system further comprises software instructions for one of embedding the recommendation as part of a response back to an incoming transaction request and posting the recommendation asynchronously to a pre-defined location.

13. The software product of claim 8 wherein the software instructions comprise a fraud detection system that communicates with one or more card payments systems using the first and second APIs.

14. The software product of claim 8 wherein the first API comprises a fixed component that allows for uniformity of sending data across multiple channels and a flexible component that allows each of the channels to send data that is unique to that channel.

15. A system, comprising:

a memory;

at least one processor coupled to the memory;

a first application programming interface (API) executed by the processor that is configured to receive real-time payment card transaction data from ingress channels and an egress channels of at least one payment card system;

a fraud monitoring component executed by the processor that is configured to generate at least two types of transactional profiles for each of at least payment cards, the ingress channel, the egress channels, and funding sources of the payment cards, wherein a first type of transactional profile comprises a network graph of links between the ingress channels, the egress channels, the payment cards, and any users of the payment cards and geo-location identities associated with the payment cards; and wherein a second type of transactional profile comprises a series of transactional usage patterns at different time intervals of each of the payment cards, the ingress channels, the egress channels, and the funding sources;

a fraud scoring component executed by the processor that is configured to receive transaction data for a current payment card transaction, and evaluate the transaction data using a predictive algorithm that compare the transaction data to the transactional profiles to calculate a probabilistic fraud score for the current transaction;

a fraud recommendation component executed by the processor that is configured to evaluate the probabilistic fraud score and the current transaction data based on a set of rules to generate a recommendation to approve, decline or review the current transaction; and a second API executed by the processor that is configured to transmit the recommendation back to the payment card system.

16. The system of claim 15 wherein the fraud monitoring component further populates an external data verification database with data retrieved from external sources and using the data for verification of geo-location, phone numbers, and addresses associated with the current payment card transaction.

17. The system of claim 15 wherein the fraud scoring component calculates the probabilistic fraud score using multiple predictive algorithms comprising any combination of regression, decision trees, neural networks, random forest, and genetic algorithms.

18. The system of claim 15 wherein the fraud scoring component evaluates the probabilistic fraud score utilizing a rules language to build and deploy cutoff strategies for creating appropriate recommendations.

19. The system of claim 15 wherein the recommendation is transmitted back to the payment card system by one of embedding the recommendation as part of a response back to an incoming transaction request and posting the recommendation asynchronously to a pre-defined location.

20. The system of claim 15 wherein the system comprises a fraud detection system that communicates with one or more card payments systems using the first and second APIs.

21. The system of claim 15 wherein the first API comprises a fixed component that allows for uniformity of sending data across multiple channels and a flexible component that allows each of the channels to send data that is unique to that channel.

* * * * *